MEMORY READING CHANNEL SELECTOR

Filed Aug. 21, 1956 3 Sheets-Sheet 1

INVENTORS:
Bernard T. Wilson
Frank A. Bridges
By Louis A. Kline
John T. Matlago
Their Attorneys INVENTORS:
Bernard T. Wilson
Frank A. Bridges
By Earl Beust
Louis A. Kline
John J. Matlago
Their Attorneys INVENTORS:
Bernard T. Wilson
Frank A. Bridges
By Earl Berst
Louis A. Kline
John J. Matlago
Their Attorneys United States Patent Office 3,041,586

Patented June 26, 1962

3,041,586

MEMORY READING CHANNEL SELECTOR

Bernard T. Wilson, Los Angeles, and Frank A. Bridges, Redondo Beach, Calif., assignors to The National Cash Register Company, Dayton, Ohio, a corporation of Maryland Filed Aug. 21, 1956, Ser. No. 605,388
13 Claims. (Cl. 340—174.1)

This invention relates to magnetic drum playback circuitry and more particularly to novel circuitry for eliminating spurious signals due to transients arising when switching from one magnetic head to another.

The circuitry associated with the playback heads which read information recorded as binary flux patterns within discrete areas of the sensitized surface of the rotating drum memory of a computer should operate to amplify the induced signal, discriminate against noise voltages, and allow for gating of a particular playback head by, for instance, the channel select function generated in the computer. One arrangement of playback circuit used in the prior art employs a magnetic head comprising a core of soft iron or the like and coils wound thereon, one coil for reading signals from the drum and a second coil for recording signals on the drum. The playback coil voltage is applied to the control grid of a pentode preamplifying tube, the suppressor grid of which is conveniently employed to carry the channel select function received from the channel select matrix of the computer. Thus this tube functions as an "and" gate as well as an amplifier, i.e., a coincidence of proper voltages on the suppressor grid (channel select function) and the control grid (playback signal) is required to cause the tube to pass signal current. A similar preamplifier stage is employed to cooperate with each of a plurality of other heads among which selection is made by the channel select function. The terminals of all preamplifier stages from which outputs are taken are connected to a common junction. The selected signal output appearing at the common junction is then further amplified, shaped to a square waveform, and clamped at the levels +100 v. and +125 v. to conform with the logical amplitude level and form required by computer operations. The square waveform signal is then differentiated and limited to form negative pulses which are caused to trigger the memory flip-flop. Thus one direction change in flux pattern in the channel causes the memory flip-flop to be triggered into a true state and an opposite direction change in flux pattern in the channel causes the memory flip-flop to be triggered into a false state. Thus the outputs of the memory flip-flop are controlled to generate electrical signals which correspond to the flux pattern on the drum.

In accordance with the above resume of circuitry, well understood in the prior art, it is apparent that channel selection is accomplished when the signal is at a low level of amplitude, i.e., at the preamplifier stage, and it is not unusual for the magnitude of the signal induced in the playback coil to be of the order of 250 millivolts. Channel selection when the signal is at a low level of amplitude is preferable since this allows all subsequent amplification stages to be common to a number of heads, thus resulting in a minimum number of amplifiers for a memory drum. However, as a result of this low level channel switching, transient impulses, originating as will be described, may be of amplitude sufficient to mask or override the desired signal to the extent that spurious triggering of the memory flip-flop occurs. Thus the output of the memory flip-flop may no longer represent the signal as originally recorded on the drum.

These aforementioned transient impulses have the greatest detrimental effect on especially that portion of the system circuitry which provides coupling between successive amplification stages for the alternating voltage of the signal.

To exemplify, consider the channel select function as it appears on the suppressor grid of the preamplifier stage. It is, of course, highly desirable that the channel select function, i.e., the selective signal output from the channel select matrix defining the particular channel with which communication is to occur, be at the same level of voltage regardless of which channel is selected. However, as is well known, the components of the channel select matrix, particularly the crystal diodes thereof, are not identical in electrical characteristics. In addition, the outputs of the channel select register, which serve as input to the matrix, are clamped by crystal diodes which also possess slightly different characteristics. Thus it is not unusual for the channel select function to be at voltage levels differing by as much as 5 volts D.C. for a nominal value of +125 v. for the various channel selections. For example, if the gain of the preamplifier stage is tenfold, for a signal input of 0.25 volt, it is seen that the channel switching transient may produce a D.C. voltage level shift commensurate in amplitude to the signal. The preamplifier stage acts to cause the signal voltage to ride as modulation on the level change in D.C. voltage caused by channel switching. When this composite signal is A.C. coupled to succeeding amplifier stages, differentiation by coupling networks produces a voltage pulse on the grid of the first tube for each change in D.C. voltage level. Of course, the charge accumulated in the coupling network due to the voltage pulse dissipates in a period of time controlled by the time constant of the network. However, until full dissipation occurs, the signal cannot be shaped for triggering the memory flip-flop and, even under optimum coupling design, the delay required is appreciable in terms of computer operation speed. It is for this reason mainly that the computer must be inhibited from reading signals recorded on a register of the memory drum for a fixed period delay after selection of the channel in which the register is located.

It is thus an object of the present invention to provide a circuit for reading information signals recorded on a memory drum which allows reading the playback signal from a magnetic head immediately upon switching to that head from another head.

It is an additional object of this invention to provide circuitry for switching between heads of a memory drum which enables switching to be accomplished when the signals sensed from the drum are at a low level of voltage, without the introduction of errors due to variations in the switching voltages of approximately the same magnitude.

It is also an object of this invention to provide a switching circuit for magnetic heads which will maintain the output signal at a constant D.C. voltage level regardless of variations of voltage level of the channel select functions.

Briefly, this invention comprises a novel switching circuit for reading of magnetic heads, which enables reading from a magnetic head immediately upon switching to one head from another, by maintaining a constant D.C. voltage level on the playback line. As was discussed, this variation in D.C. level of the playback signal is conventionally caused by the variation of switching voltage of the channel select functions. This circuit controls the switching voltage of the channel select functions by a novel feedback arrangement.

Switching is carried out at the preamplifier stage by a separate preamplifier tube and gating tube for each head, for example. At each head, the anode to cathode current paths of the preamplifier tube and the gating tube are connected in series, with the cathode of the preamplifier tube connected to the anode of the gating tube. The induced signals from the surface of the memory drum are applied to the preamplifier tube between its grid and its cathode by two signal lines connected to the playback coil of the magnetic head. The channel select function for switching to read a selected head is applied to the grid of the gating tube. The anode of each preamplifier tube is connected to a common playback line and the cathode of each gating tube is connected to a common D.C. reference line. The playback line is connected to a high potential by way of a common anode resistor while the D.C. reference line is grounded by way of a common cathode resistor. Therefore, by maintaining a constant D.C. current through the common anode resistor and common cathode resistor for any of the heads being read, the playback signal can be maintained at a constant D.C. level.

In order to maintain a constant D.C. current through the common anode resistor and common cathode resistor regardless of which head is selected for reading, a novel error correcting circuit arrangement is provided. This circuit comprises a D.C. error correcting circuit which senses a small change in voltage level of the D.C. reference line, the voltage of this line being proportional to that of the common playback line, and after amplifying and inverting this voltage change, feeds it back to the grid of the selected gating tube as a change of voltage level of the channel select function. This inverted and amplified signal thus acts to change the current in the gating tube to prevent a large D.C. error from appearing on the playback line.

As is well known, the switching voltage of the channel select function is determined by the clamped upper voltage levels of the logical signals on the logical lines which pass from the channel selection flip-flops to the channel select matrix. Therefore, in order to control the switching voltage or upper level voltage on the channel select functions, this error correcting circuit controls the voltage level applied to the upper level clamps on the logical lines from the channel selection flip-flops.

In order for this D.C. error correcting circuit to function properly, it is necessary to prevent the A.C. voltage variation, caused by the playback signal varying the voltage level on the anode of the gating tube, from appearing on the D.C. sense line. Also, in order for the amplifier tube to amplify with the playback signal connected between its grid and cathode which is connected to the anode of the gating tube, it is necessary that these A.C. voltage variations be eliminated from the cathode of the amplifier tube which is connected to the anode of the gating tube. Therefore, an A.C. error correcting circuit is provided to maintain the anode of the gating tube at a steady D.C. voltage level.

This A.C. correcting circuit attenuates and feeds the amplified and inverted playback signal from the common playback line into the D.C. error correcting circuit where it is inverted and fed back through the upper level clamping diodes of the logical lines at the outputs of the channel selection flip-flops, to the grid of the selected gating tube. This signal is then inverted again and passed to the anode of the gating tube where, since it is in a condition inverted from the playback signal, prevents the variation of the playback signal from appearing at the anode and on the D.C. sense line. As a result, the D.C. error correcting circuit is able to function independently of the A.C. error correcting circuit and the preamplifier tube is able to amplify with its cathode held at a steady D.C. level.

The objects and many of the attendant advantages of this invention will become readily apparent as the same becomes better understood by reference to the preferred embodiment detailed in the following description and accompanying drawings in which.

Figures 1, 3:
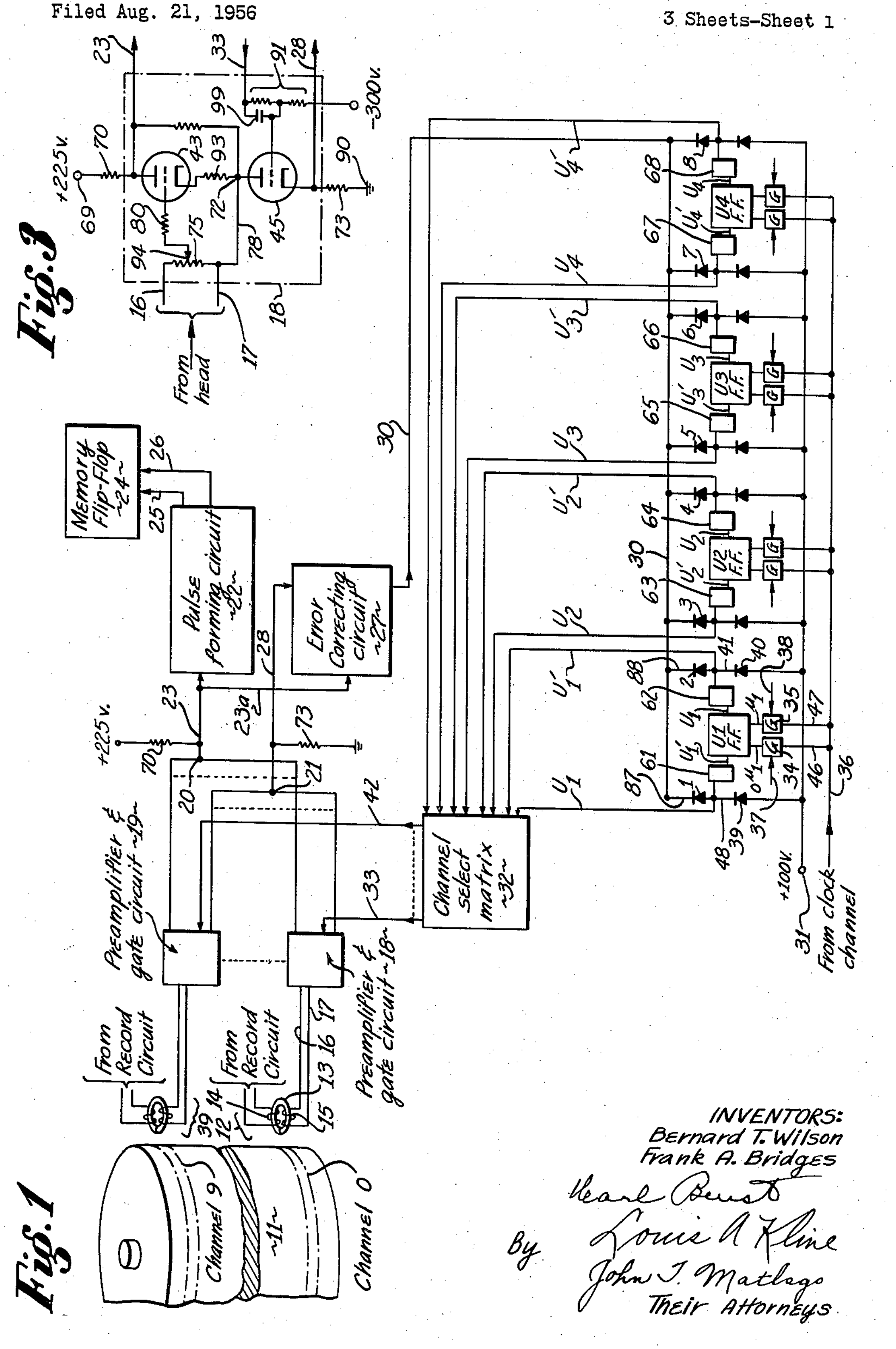
FIG. 1 is an overall block diagram of the portion of the computer memory system relevant to this switching circuit.
FIG. 3 is a schematic diagram of the preamplifier and gate circuit.

Referring now to FIG. 1, here is schematically shown a block diagram of the part of a computer memory system which is relevant to this invention. Memory drum 11 has provision for ten information channels designated as channels 0 through 9. Positioned adjacent to channel 0 so as to permit recording of the signals thereon or reading signals therefrom is magnetic head 12 which comprises two coils wound on a split core 13. Record coil 14 is connected to the record circuitry of the computer (not shown) and functions to magnetize the sensitized surface of drum 11 along channel 0 in accordance with the information to be stored. Playback coil 15 operates to sense information stored along channel 0 and is connected to the preamplifier and gate circuit 18 by signal lines 16 and 17. It is to be noted that each of the ten channels has a similar magnetic head and preamplifier and gate circuit associated with it, as for example magnetic head 39 and preamplifier and gate circuit 19 associated with channel 9. As shown, these circuits are all connected to a 225 v. source through a common resistor 70 and to ground through a common resistor 73. The preamplifier and gate circuit 18, which will be described in detail later, contains a gate which, when opened, will allow the playback signal on signal lines 16 and 17 to pass through the preamplifier. The gate of preamplifier and gate circuit 18 is switched open in response to the switching voltage of a channel select function appearing on channel select line 33. The amplified signal from the preamplifier and gate circuit 18 is sensed at junction 20, this being the common output junction for all 10 channels of drum 11, passes to pulse forming circuit 22 by way of common playback line 23. Pulse forming circuit 22, which will be described in detail later, further amplifies this playback signal, shapes it and clamps it at logical levels to be passed to the memory flip-flop 24 by way of lines 25 or 26.

Channel selection is accomplished, as is well known, by a set of flip-flops U1 to U4 arranged as a channel selection register. Each flip-flop has diode gates, such as gates 34 and 35, for flip-flop U1. Each gate 34 and 35 has an input line 46 and 47, respectively, from clock line 36, and logical inputs 37 and 38, respectively, from the computer network (not shown). The outputs from gates 34 and 35, lines ${}_0u_1$ and $u_1$, are connected to the grids of the tubes contained in flip-flop U1, as well known in the art. Each gate 34 or 35 is opened to activate ${}_0u_1$ or $u_1$, respectively, by a clock pulse, dependent on the logical inputs 37 and 38, thus triggering the flip-flop into one state or the other. As is well known, one of the output lines, as $U_1'$, has a high voltage impressed upon it while the other output line, as $U_1$, has a low voltage impressed upon it. These output voltages on output lines $U_1'$ and $U_1$ then pass through matrix drivers 61 and 62, where the output line with the high voltage becomes low and the output line with the low voltage becomes high on logical lines $U_1$ and $U_1'$. The high and low voltages on logical lines $U_1'$ and $U_1$ are then clamped at two logical potentials, +100 v. supplied from terminal 31 and at a higher potential, nominally +125 v. supplied from clamping line 30. Clamping at the +100 v. level is accomplished, for example, by clamping diode 39 in line 48 and clamping diode 40 in line 41. Clamping at the higher voltage level is accomplished by clamping diodes 1 to 8, clamping diode 1 in line 87, and clamping diode 2 in line 88, for example.

The combinations of the two logical potentials (nominally +100 v. or +125 v.) on the logical lines $U_1$, $U_1'$, $U_2$, etc., pass into the channel select matrix 32 where selection of the desired channel is carried out by a plurality of diode gating circuits, as will hereinafter be described in detail. The selected channel is then switched to be read by the switching voltage of the channel select function appearing on only the one channel select line, as line 33, which passes to the selected preamplifier and gate 18.

As was discussed, the high level switching voltage of the channel select function on the different channel select lines, such as 33 and 42 for example, conventionally varies. Therefore, novel error correcting circuit 27 is provided to control this high level switching voltage level at a fixed value. The input to error correcting circuit 27 is line 28 from D.C. common reference junction 21 and line 23*a* from common playback junction 20. The output from error correcting circuit 27 is clamping line 30 which, through the clamping potential impressed on diodes 1 to 8, controls the upper voltage level of the logical signals on logical lines $U_1$, $U_1'$, $U_2$, etc., which in turn determines the switching voltage of the channel select functions on the channel select lines, as line 33 for example. This switching voltage in turn controls the D.C. level of the playback signal on common junction 20 and consequently on playback line 23. Thus this novel error correcting circuit 27 acts as a self-contained feedback circuit to prevent changes in D.C. level from appearing on playback line 23 during switching from one channel to another.

Figure 2:
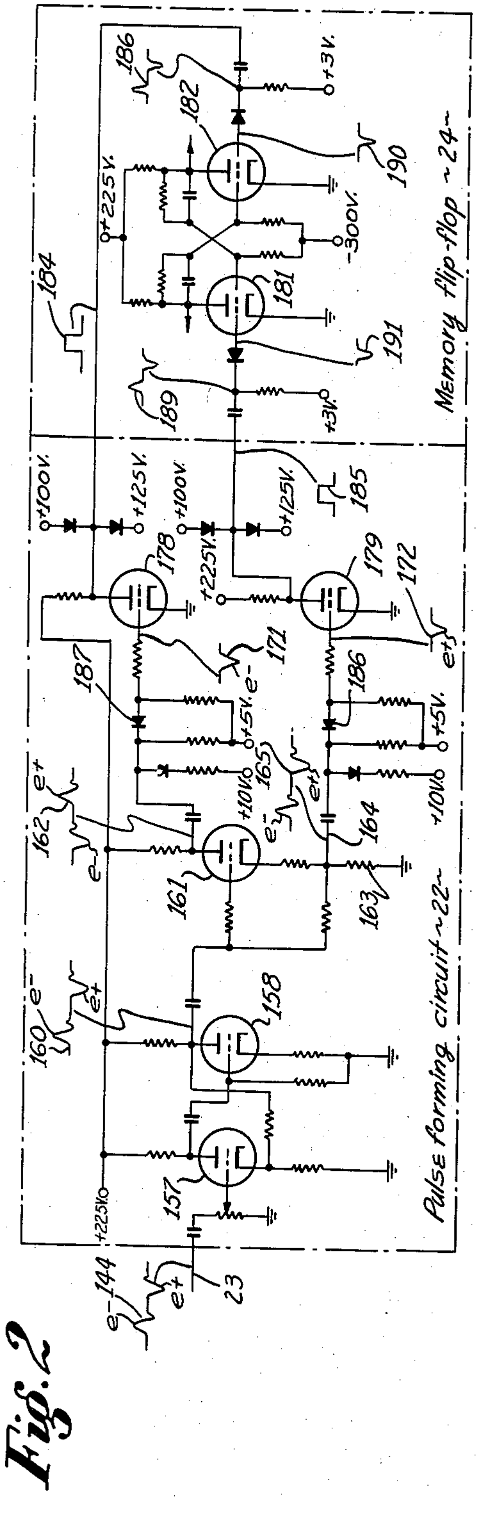
FIG. 2 is a schematic diagram of the pulse forming circuits and the memory flip-flop.

Refer now to FIG. 2 which is a detailed circuit of pulse forming circuit 22 and memory flip-flop 24 of FIG. 1.

The playback signal on playback line 23, as shown by waveform 144, contains pulses $e^-$ and $e^+$. Pulse $e^-$ is the negative pulse and pulse $e^+$ is the positive pulse which are induced in signal line 16 during reading by magnetic head 12 of the two states of magnetic flux of the information stored on memory drum 11, as shown in FIG. 1. These pulses on signal line 16, which will be discussed in detail hereafter, are inverted and amplified in preamplifier and gate circuit 18 of FIG. 1 to appear on line 23 as shown by waveform 144. These pulses are then fed through a two-stage amplifier, comprised of amplifier tubes 157 and 158, which emits pulses of the same polarity as the input, as shown by waveform 160. These latter pulses are then fed to the grid and cathode of inverter tube 161 which comprises the phase inverter circuit. The pulses are inverted to appear on the anode output of inverter tube 161, as shown by waveform 162, and on the cathode output of inverter tube 161, as shown by waveform 165. These two signals of waveforms 162 and 165 then pass through the clipper circuit comprising diodes 187 and 186 which passes only the negative pulses as shown by waveforms 171 and 172. Waveform 171 contains only the pulse $e^-$ of waverform 162 and waveform 172 contains only the pulse $e^+$ of waveform 165, these two pulses being separated by a time interval corresponding to the time interval between the pulses $e^-$ and $e^+$ of waveform 144.

These pulses of waveforms 171 and 172 are then applied to the grids of tubes 178 and 179 which serve to invert the pulses applied thereto. These inverted pulses are then clamped between +100 v. and +125 v. so as to provide the pulses with an abrupt rise and fall time, i.e., to square the pulses. These inverted pulses are then applied to the memory flip-flop 24 comprised of tubes 181 and 182. Memory flip-flop 24, which is of the Eccles-Jordan type, is well known in the art, and thus need not be discussed in detail. In operation, the leading and trailing edges of the squared pulses of waveforms 184 and 185 are differentiated to form the pulses of waveforms 186 and 189 which are then limited to form the negative going peaked pulses, as shown by waveforms 190 and 191, corresponding only to the trailing edges of the squared pulses of waveforms 184 and 185. Thus pulses $e^+$ and $e^-$ trigger tubes 181 and 182, respectively, into conduction. Output is taken from the anode of each tube and transmitted to other computer circuitry (not shown).

Figure 6:
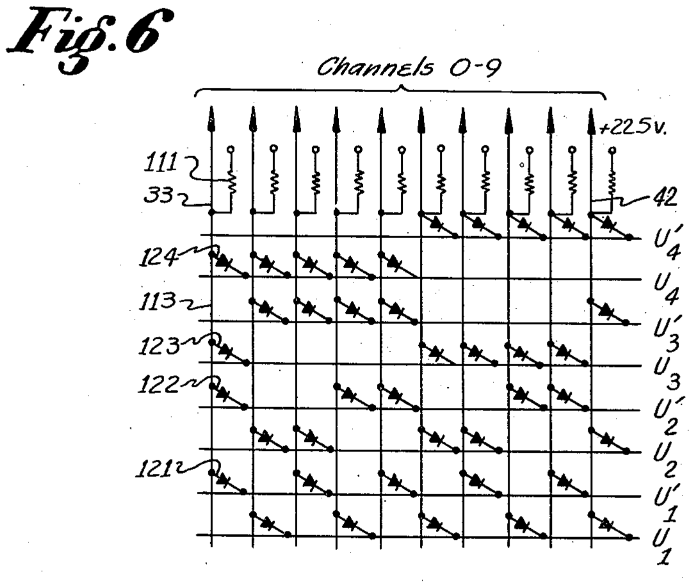
FIG. 6 is a schematic diagram of the channel select matrix of FIG. 1.

In order to explain the operation of the channel select matrix 32, refer to FIG. 6 which is a schematic diagram of the channel select matrix 32 of FIG. 1. Eight logical lines $U_1$, $U_1'$, $U_2$, etc. pass into the matrix from the channel select flip-flops U1–U4 while ten channel select lines, such as line 33 for channel 0, pass out of the matrix and connect to the grid of a gating tube, as gating tube 45 (FIG. 3). Channel select line 33, for example, is an extension of common line 113 to which the logical lines $U_1'$, $U_2'$, $U_3$, and $U_4$ are connected by diodes 121, 122, 123, and 124, respectively. A +225 v. source is also connected to the common line 113 through a load resistor 111. Each common line associated with channels 0 to 9 is connected by a similar number of diodes to a different combination of logical lines $U_1$, $U_1'$, $U_2$, etc.

The operation of this circuit is such that it is only when all of the inputs to common line 113, logical lines $U_1'$, $U_2'$, $U_3$, and $U_4$, are at the high level operating potential of, for example, +125 v. that the output to channel 0 on the channel select line 33 is at substantially the same high potential. Each of the logical lines $U_1'$, $U_2'$, $U_3$, and $U_4$ connected to common line 113 can have either the high potential of +125 v. or the low potential of +100 v. Thus only one of the channel select lines, such as line 33 for channel 0, will be at the effective switching potential of +125 v. at any one time while all other channel select lines will be at the ineffective potential of +100 v.

Figures 4, 7:
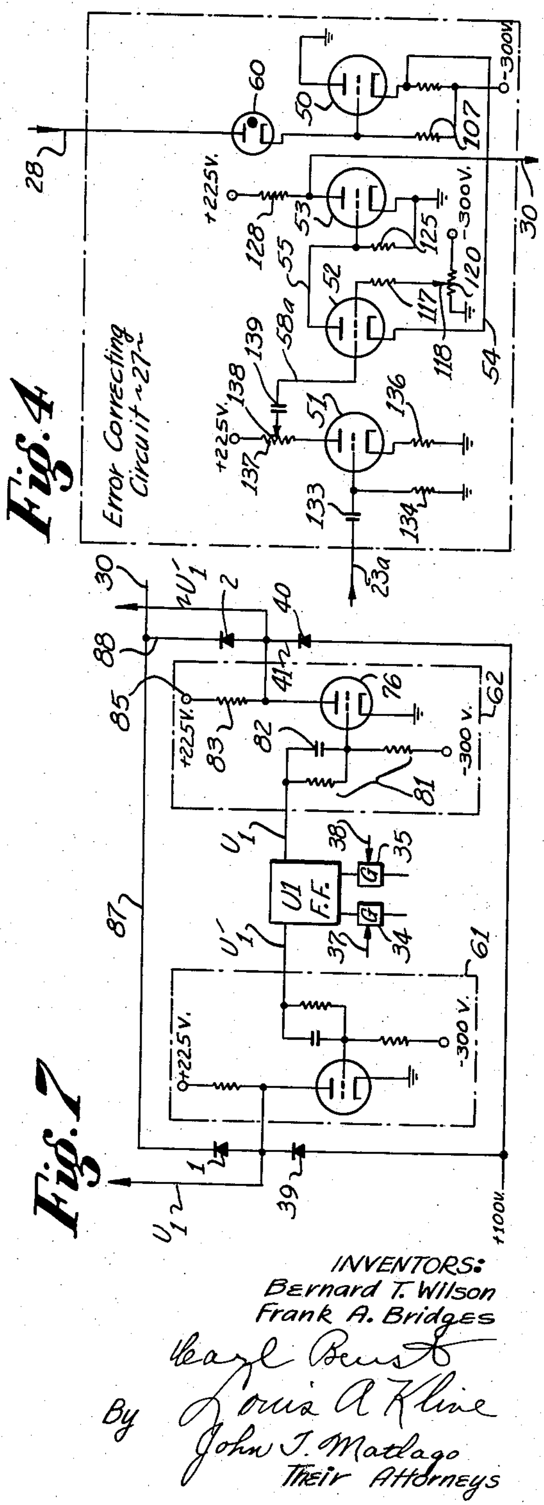
FIG. 4 is a schematic diagram of the error correcting circuit.
FIG. 7 is a schematic diagram of the matrix driver circuits of FIG. 1.

Refer now to FIG. 7 which is a schematic diagram of matrix drivers 61 and 62 of FIG. 1. Since matrix drivers 61 to 68 of FIG. 1 are similar, only matrix driver 62 will be described.

Output line $U_1$ from flip-flop U1 is connected to the grid of driver tube 76 by means of voltage divider 81 which is connected to a −300 v. potential. Capacitor 82 is connected between the grid and output line $U_1$ in order to decrease the response time of driver tube 76. Driver tube 76 has its cathode grounded and its anode connected to a +225 v. terminal 85 by way of resistor 83. The logical line $U_1'$ is connected to the anode of driver tube 76 and is clamped by means of clamping diodes 2 and 40.

As the output line $U_1$ of flip-flop U1 goes low or to its false state for example, driver tube 76 is biased into non-conduction. This raises the voltage on logical line $U_1'$ toward the +225 v. of terminal 85. However, as the voltage on logical line $U_1'$ reaches the voltage supplied to the cathode of clamping diode 2, this diode is biased into conduction and current flowing from terminal 85 passes through clamping diode 2 to clamping line 30 and to the error correcting circuit 27 of FIG. 1. Thus logical line $U_1'$ is in its true state and is held at a voltage determined by the voltage on clamping line 30.

Now refer to FIGS. 6 and 7 for a description of the clamping operation of this circuit. As is well known, the switching voltage level (nominally 125 volts) of the channel select functions on the channel select lines, such as lines 33 and 42, is not constant when selecting different channels because of the variations in forward voltage drop of the diodes 121, 122, etc. in the channel select matrix 32 and of the clamping diodes 1 to 8. These variations in the upper switching voltage level may be caused by diodes which vary from each other in forward voltage drop characteristics or by variations of current flow through the diodes.

As an example of one diode variation, assume that when switching to read channel 0, clamping diode 2 characteristically has a smaller forward voltage drop than clamping diodes 4, 5, and 7. This condition results in the logical function on logical line $U_1'$ having a lower voltage level than on logical lines $U_2'$, $U_3$, and $U_4$. Therefore, since the voltage on common line 113 is determined by the voltage impressed on the cathodes of diodes 121, 122, 123, and 124, the current from load resistor 111 will flow through diode 121 rather than through diodes 122, 123, and 124. This increased current through diode 121 and clamping diode 2 causes the voltage on common line 113 to rise some, but not enough to allow current to flow through diodes 122, 123, and 124. Therefore, the switching voltage is lower on common line 113 and channel select line 33 than if clamping diode 2 had characteristics similar to clamping diodes 4, 5, and 7. Since the characteristics of the diodes concerned with selection of all ten channels will vary, the D.C. voltage of the channel select function may change levels during switching. However, this novel error correcting circuit prevents these variations in switching voltage of the channel select functions by controlling the voltage applied to the cathode of clamping diodes 1 to 8 of FIG. 1.

For a detailed description of this novel switching circuit, refer now to FIG. 3, which is a schematic diagram of the preamplifier and gate circuit 18 of FIG. 1. Preamplifier tube 43 is arranged in series with gating tube 45 to pass current from the +225 v. potential at terminal 69 through preamplifier tube 43 and through gating tube 45 to ground 90. Terminal 69 is connected to the anode of preamplifier tube 43 by way of common anode resistor 70, the cathode of tube 43 is connected to the anode of gating tube 45 by way of resistor 93, and the cathode of tube 45 is connected to ground 90 by way of common cathode resistor 73. The induced playback signal from magnetic head 12 appears across resistor 75 which is connected to the ends of playback coil 15 (FIG. 1) by signal lines 16 and 17. The grid of preamplifier tube 43 is connected to adjustable tap 94 on resistor 75 by way of resistor 80. Adjustable tap 94 allows amplitude adjustment of the playback signal and resistor 80 limits the voltage applied to preamplifier tube 43 during recording. Line 78 is connected between signal line 17 and junction 72 which is at the anode of gating tube 45. Channel select line 33 is connected to the grid of gating tube 45 by way of voltage divider 91 which connects to a —300 v. potential. Connected between channel select line 33 and the grid is capacitor 99 which passes the high frequency components of the channel select function waveform. When gating tube 45 is switched to allow current to flow from terminal 69 to ground 90, an output from the preamplifier tube 43 appears on playback line 23 which is connected to the anode of tube 43 and is common to all preamplifier and gate circuits, as circuit 18, of memory drum 11 (FIG. 1). D.C. sense line 28 connects to the cathode of gating tube 45 and is also common to all preamplifier and gate circuits, as circuit 18, of memory drum 11 (FIG. 1). It is to be noted that terminal 69 and anode resistor 70, and cathode resistor 73 and ground 90 are common to all preamplifier and gate circuits, such as circuit 18.

Now refer to FIG. 4 which is a schematic diagram of the error correcting circuit 27 of FIG. 1. Circuit 27 comprises both a D.C. error correcting circuit and an A.C. error correcting circuit.

The D.C. error correcting circuit comprises line 28, which connects common D.C. reference junction 21 (FIG. 1) to the grid of reference tube 50 by way of gas tube 60. Line 28 is then returned to a —300 v. potential by a resistor 107. Gas tube 60 lowers the D.C. voltage level impressed on the grid of D.C. reference tube 50. D.C. reference tube 50 is connected as a cathode follower in order to lower its output impedance and has its anode grounded and its cathode resistor connected to the —300 v. potential. The output of this cathode follower is passed by line 54 to the cathode of D.C. control tube 52. Tube 52 has its grid referenced to an adjustable tap 118 on resistor 120 by way of resistor 117, in order to provide adjustment of the D.C. voltage level on the common playback line 23 (FIG. 3). Resistor 120 is connected between ground and a —300 v. terminal. Output line 55 connects the anode of D.C. control tube 52 to the grid of driver tube 53 which grid is grounded by way of resistor 125. Driver tube 53, which has its cathode grounded and its anode connected to a +225 v. source by way of a connection to clamping line 30 and resistor 128, inverts the input signal which is then passed to clamping line 30. Clamping line 30, as seen in FIG. 1, connects to the cathode ends of the clamping diodes 1 to 8 of logical lines $U_1$, $U_1'$, $U_2$, $U_2'$, etc.

The A.C. error correcting circuit comprises A.C. control tube 51 which has its input from line 23*a* which connects from playback line 23, as can be seen in FIG. 1. Line 23*a* is A.C. coupled to the grid of A.C. control tube 51 by capacitor 133 and grounded resistor 134. A.C. control tube 51, which acts to invert and attenuate the A.C. signal from line 23*a*, has its cathode connected to ground by way of resistor 136 and its anode connected to a +225 v. potential by way of resistor 137. The output from tube 51 is from adjustable tap 138 on resistor 137 and connects by line 58*a*, which is A.C. coupled by capacitor 139 to the grid of amplifier tube 52. Tap 138 is adjusted for cancelling of the A.C. signal at the plate of gating tube 45 (FIG. 3) as will be subsequently described.

Figure 5:
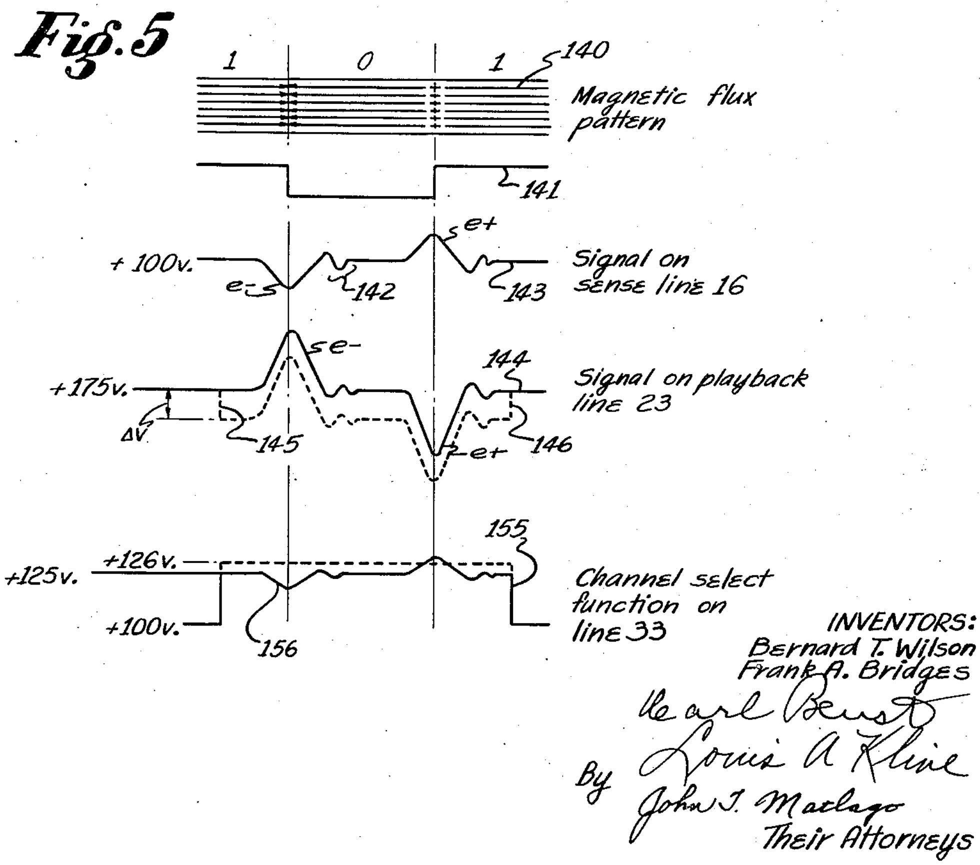
FIG. 5 is a group of waveforms appearing at various points in the circuits of FIGS. 1, 3, and 4.

For a description of the overall operation of this error correcting circuit, refer back to FIG. 3 and to FIG. 5 which show the waveforms to explain the circuit.

As memory drum 11 (FIG. 1) revolves, the binary digits "one" and "zero" recorded on channel 0 in the magnetic saturation pattern 140, diagrammatically shown as waveform representation 141, induces electrical signal pulses in playback coil 15. These signal pulses are in turn shown represented by waveform 143 since the signal voltage appears on line 16 as a positive pulse $e^+$ corresponding to the leading edges of waveform 141 and a negative pulse $e^-$ corresponding to the trailing edges of waveform 141. Waveform 143 is characterized by unwanted overshoot pulses 142 associated with each pulse $e^+$ and $e^-$. These overshoot pulses 142 result from the well-known "ringing" oscillation of head 12 when a voltage pulse is suddenly induced therein. However, since coil 15 is loaded down by resistor 75, these overshoot pulses 142 are quickly damped out. Assume that channel 0 (FIG. 1) has been selected to be read by the channel select function applied to the grid of gating tube 45. Thus the pulses of waveform 143 are amplified and inverted in preamplifier tube 43 where they appear on playback line 23 as shown by waveform 144, and then pass to the pulse forming circuits 22 of FIG. 1, to trigger the memory flip-flop 24, as was discussed.

Refer now to the circuit of FIG. 4 and the waveforms of FIG. 5. Assume that upon switching to channel 0 the switching voltage of the channel select function, as shown by waveform 155, is at 126 volts because of the properties of the diodes of the channel select matrix 32 and the clamping diodes 1 to 8 of FIG. 1. Also assume that the channel select function when reading the previous channel was at +125 volts which gave the desired +175 v. D.C. level at junction 20, as shown by waveform 144. This 126 volts on the channel select line 33 would cause an abrupt voltage fall 145 of waveform 144. Also, there would be a sharp voltage rise 146 when another channel is selected which, for example, has its channel select function at 125 volts, and this results in the desired +175 v. D.C. level at junction 20. If these changes in voltage level, 145 and 146, were allowed to appear at junction 20, they would form undesired signals due to the A.C. coupling of the pulse forming circuits 22 of FIG. 1, which would cause spurious triggering of the memory flip-flop 24. Therefore, before reading from a selected channel, a delay of several word periods would be required, so that the transients caused by these changes in voltage levels can be dissipated. However, this D.C. error correcting circuit prevents these sharp voltage changes 145 and 146 from appearing at junction 20.

Upon switching to channel 0, the D.C. voltage level of waveform 144 initially begins to fall, as shown at 145, as the switching voltage of waveform 155 starts to rise toward +126 volts. This small drop in level at junction 20 also appears on D.C. reference line 28 as a small increase in D.C. level and is passed through D.C. reference tube 50 to D.C. control tube 52. This inrease in D.C. level is amplified and passed to driver tube 53 where it is then inverted and further amplified and impressed on the clamping diodes 1 to 8 of FIG. 1 to decrease the upper clamping voltage level. This drop of clamping voltage level results in a corresponding drop of the upper voltage level of the logical signals applied to channel select matrix 32 (FIG. 1). Therefore, the switching level of the channel select function of waveform 155 falls to 125 volts which prevents the sharp fall 145 of waveform 144 from occurring. Thus junction 20 has been prevented from changing its D.C. voltage level. This error correcting circuit operates in a similar manner to prevent increases of D.C. voltage level at junction 20.

Refer now to FIGS. 3, 4, and 5 for an explanation of the A.C. error correcting circuit which is provided in order for the preamplifier tube 43 to amplify with the gating arrangment of this circuit, and for the D.C. error correcting circuit to operate independently of the A.C. variations caused by the playback signal. This A.C. correcting circuit maintains the anode of gating tube 45 and the D.C. reference line 28 at a level as determined by the D.C. error correcting circuit by preventing the output signal on signal line 16 from appearing at these points.

If it were not for this circuit, the pulses $e^-$ and $e^+$, as seen by waveform 143 (FIG. 5), would appear at the anode of gating tube 45 and similar pulses would appear on D.C. sense line 28. The operation of the A.C. correcting circuit when pulse $e^-$ appears on signal line 16 will be explained, but the circuit would operate in a similar manner when pulse $e^+$ appears.

When a small signal appears at junction 72 as a result of pulse $e^-$ starting to appear on signal line 16, a small negative signal also appears on D.C. reference line 28. This small negative signal is carried through D.C. reference tube 50 with the D.C. signal and appears on the cathode of D.C. control tube 52. At the same time the amplified and inverted output signal on playback line 23*a*, as shown by pulse $e^-$ of waveform 144, is passed to A.C. control tube 51. This positive pulse is attenuated, as determined by adjustable tap 138, and inverted, and then passed to the grid of D.C. control tube 52. In this tube the small pulse from D.C. reference line 28 is effectively cancelled and the negative output signal from A.C. control tube 51 is amplified and inverted and passed to driver tube 53 as a positive signal. The signal is again amplified and inverted and applied to clamping diodes 1 to 8 of FIG. 1 as a negative signal. The negative signal then passes through channel select matrix 32 of FIG. 1 and onto the switching voltage of the channel select function, as shown by negative pulse 156 of waveform 155. The negative pulse 156 is inverted and amplified in gating tube 45, thus effectively preventing the pulse $e^-$ of waveform 143 from appearing. Thus the small negative pulse, which was fed back, is the largest A.C. error which is allowed to appear at junction 72 and D.C. reference line 28.

It has thus been shown that the D.C. error correcting circuit is able to function independently of the A.C. variations of the playback signal and the amplifier tube 43 is able to amplify with its cathode referenced to a steady potential.

It is to be noted that although the preferred embodiment is comprised of ten channels with one head per channel, this switching circuit is equally applicable to channels which contain more than one magnetic reading head. Also this circuit eliminates noise voltages which are induced in the lines of the channel select matrix and conventionally appear on the channel select function. Changes of D.C. voltage level of the playback signal caused by changing amplification characteristics of pre-amplifier tubes with age are also prevented by this novel circuit.

Since this switching circuit maintains a constant D.C. level on its playback line at all times when switching from one channel to another during reading, the information from any channel can be read immediately upon switching to that channel.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Circuitry for enabling signals to be selectively read from a cyclical memory by switching from one head to another, comprising: a preamplifier tube and a series connected gating tube for each head; a common junction to which the outputs of said preamplifier tubes are connected; a head selecting circuit having an output connected to each said gating tube for gating the amplified output of the associated head to said common junction; and an error correcting circuit responsive to the D.C. current through said preamplifier and gating tubes, the outputs of said head selecting circuit having an upper clamping voltage which varies in accordance with the output of said error correcting circuit, whereby the D.C. voltage on said common junction is maintained at a fixed potential.

2. Playback circuitry for switching from one channel to another of a moving memory, comprising: a reading head associated with each channel; an input circuit for each reading head including a signal preamplifier and gating tube; a common playback line connected to the output of each said input circuits; a channel selecting register having outputs connected to said input circuits for selecting the head whose signals are to be gated onto said playblack line; and a feedback circuit responsive to variations in D.C. current in said input circuits for varying the voltages on the outputs of said channel selecting register to maintain said playback line at a fixed D.C. voltage level irrespective of the input circuit that is gated to said playback line.

3. Playback circuitry for switching from one channel to another of a moving memory comprising: a signal preamplifier tube and a gating tube connected to a reading head associated with each channel with the cathode of said preamplifier tube connected in series with the anode of said gating tube; a common anode resistor for said preamplifier tubes; a common cathode resistor for said gating tubes; a channel selection register comprised of a plurality of flip-flop circuits having their outputs combined to generate switching signals to be applied to said gating tubes; and a feedback circuit responsive to the voltages on said common anode and cathode resistors for controlling the D.C. voltage levels of said switching signals, thereby maintaining at the output of said common anode resistor a fixed D.C. voltage on which is superimposed the signals received from the reading head associated with the selected channel.

4. Switching circuitry for selectively reading from a plurality of signal sources comprising: a signal amplifier tube and gating tube associated with each signal source with the current paths of said amplifier tube and said gating tube connected in series; a common input resistor for said current paths; a common output resistor for said current paths; a selection register comprised of a plurality of flip-flop circuits having their outputs combined to generate switching signals to be applied to said gating tubes; upper level clamping diodes for clamping the switching signals on the outputs of said flip-flops; and a feedback circuit referenced to the potentials at the common junction of said input and output resistors for controlling the voltage on said upper level clamping diodes to maintain the common junctions of said resistors at fixed D.C. potentials, such that signals supplied to the amplifier tube of the associated selected gating tube appear across the common input resistor as a modulation superimposed on the fixed D.C. potential.

5. Playback circuitry for switching from one channel to another of a moving memory comprising: a reading head associated with each channel; a preamplifier tube and gate tube associated with each channel with the cathode of said preamplifier tube connected in series with the anode of said gate tube; a common memory playback line connected to the anodes of the preamplifier tubes; a common D.C. reference line connected to the cathodes of the gate tubes; a common anode resistor connecting said playback line to a potential source; a common cathode resistor connecting said D.C. reference line to ground; a channel selection register comprised of a plurality of flip-flops having their outputs combined to generate D.C. voltage switching signals; clamping diodes for clamping the outputs of said flip-flops; and a feedback circuit responsive to voltages on said playback line and said D.C. reference line for controlling the voltage applied to said clamping diodes, whereby the level of the D.C. voltage switching signal is varied to maintain on said playback line a substantially constant D.C. voltage on which is superimposed the signals received from the selected channel of the moving memory.

6. Circuitry for enabling pulsating signals to be selectively read from a plurality of signal sources by switching from one source to another, comprising: a signal preamplifier tube and a gating tube associated with each signal source with the cathode of said preamplifier tube connected in series with the anode of said gating tube; a common memory playback line connected to the anode of each preamplifier tube; a common D.C. reference line connected to the cathode of each gating tube; means including a resistor for connecting the preamplifier tube and gating tube for each signal source in parallel across a potential source; a selection means having switching outputs connected to each said gating tubes, thereby selecting the signal source to be connected to said playback line; means for clamping the switching outputs of said selection means; a D.C. feedback circuit connecting said D.C. reference line to said clamping means to vary the voltage of the switching outputs in accordance with the D.C. voltage on said reference line; and an A.C. feedback circuit connecting said playback line to said D.C. feedback circuit to further vary the voltage of the switching outputs in accordance with the pulsating voltage on said playback line, to thereby cancel the pulsating signals on said D.C. reference line, whereby said feedback circuits control the voltage applied to said clamping means to maintain a substantially fixed D.C. voltage on said playback line on which is superimposed the signals received from the selected signal source.

7. In combination, a plurality of independently derived signal sources, individual switching devices, and switching circuitry for selectively coupling signals from any one of said signal sources to a common output circuit through a selected individual switching device with a minimum of distortion, said switching circuitry comprising a source selecting device for selecting the signal source to be connected to the output circuit, and a feedback circuit connected from the output circuit through the selecting device to the selected switching device, said feedback circuit including means responsive to the variations in the D.C. potential at said output circuit for maintaining the potential on the output circuit at a constant mean D.C. potential on which is superimposed the signals received from the selected signal source.

8. Switching circuit comprising a plurality of switching paths connected in parallel across a power source, each path including electrically operable switching means, an input to each path from an individual one of a plurality of signal sources, source selecting circuitry adapted to be supplied with input signals indicative of a particular source to be selected, a separate input to each switching means, adapted to be selectively supplied with a switching signal generated by the selecting circuitry in response to said input signals, a common output line from one junction of the switching paths, a common D.C. reference line from the other junction of the switching paths and feedback circuitry connected to the output and D.C. reference lines and acting to generate a feedback signal determined by the potentials thereon, said feedback signal being supplied to the selecting circuitry and acting to control the amplitude of the switching signal to the selected switching means, the characteristic of each selected switching path, in response to the switching signal being such that signals supplied thereto from the selected signal source appear at the common output line as modulation superimposed on a substantially constant mean D.C. potential.

9. Switching circuitry according to claim 8 wherein each switching path comprises an amplifier tube and a gating tube, the anodes of the amplifier tubes being connected to a high potential source through a common anode load, the common output line being connected to the common anode junction and the anodes of the gating tubes being connected to the respective cathodes of the amplifier tubes through an impedance, the cathodes of the gating tubes being connected to ground through a common cathode resistor and the common D.C. reference line being connected to the common cathode junction, signals from each of said plurality of signal sources being supplied to the control grid of the amplifier tube associated therewith and the switching signal being supplied to the control grid of the gating tube of the selected switching path from the selecting circuitry.

10. Switching circuitry according to claim 8 wherein the signals indicative of the potential existing on the D.C. reference line are derived from the output of a cathode follower having an input circuit adapted to be supplied with signals indicative of the potential existing on the D.C. reference line, wherein the signals indicative of potential variations on the output line are derived from the output of an electronic tube having its control grid A.C. coupled to the output line, the latter tube being responsive to variations of potential at the control grid thereof so as to produce an inverted and attenuated representation of said variations and wherein the anode of the control tube is connected in the input circuit of an amplifier tube for producing an amplified and inverted representation of the signal appearing on the anode of the control tube.

11. Switching circuitry comprising a plurality of switching paths connected in parallel across a power source, each path including electrically operable switching means, an input to each path from an individual one of a plurality of signal sources, source selecting circuitry adapted to be supplied with input signals indicative of a particular source to be selected, a separate input to each switching means, adapted to be selectively supplied with a switching signal generated by the selecting circuitry in response to said input signals, a common output line from one junction of the switching paths, a common D.C. reference line from the other junction of the switching paths and feedback circuitry comprising an electronic control tube having at least an anode, a cathode and a control grid, signals indicative of the potential existing on the D.C. reference line being supplied to the cathode and signals indicative of variations of potential on the output line being supplied to the control grid and the feedback signal being derived from and controlled by the anode potential of the control tube, said feedback signal being supplied to the selecting circuitry and acting to control the amplitude of the switching signal to the selected switching means, the characteristic of each selected switching path, in response to the switching signal being such that signals supplied thereto from the selected signal source appear at the common output line as modulation superimposed on a substantially constant mean D.C. potential.

12. Switching circuit comprising a plurality of switching paths connected in parallel across a power source, each path including electrically operable switching means, an input to each path from an individual one of a plurality of signal sources, source selecting circuitry adapted to be supplied with input signals indicative of a particular source to be selected, a separate input to each switching means, adapted to be selectively supplied with a switching signal generated by the selecting circuitry in response to said input signals, lower voltage clamping diodes for preventing the switching signals from falling below a predetermined fixed voltage level, upper voltage clamping diodes having a feedback line connected thereto for preventing the switching signals from exceeding the potential on the feedback line, a common output line from one junction of the switching paths, a common D.C. reference line from the other junction of the switching paths and feedback circuitry connected to the output and D.C. reference lines and acting to generate a feedback signal determined by the potentials thereon, said feedback signal being supplied to the feedback line connected to the upper voltage clamping diodes and acting to control the amplitude of the switching signal supplied by the selecting circuitry to the selected switching means, the characteristic of each selected switching path, in response to the switching signal, being such that signals supplied thereto from the selected signal source appear at the common output line as modulation superimposed on a substantially constant mean D.C. potential.

13. Switching circuitry according to claim 12 wherein the selecting circuitry comprises a source select register responsive to input signals supplied to selected ones of a plurality of inputs so as to generate signals, indicative of a predetermined signal source, on a plurality of output circuits, the potential on each of said plurality of output circuits being maintained by the clamping diodes either at the upper clamping voltage or at the lower clamping voltage, in accordance with a predetermined code and a diode matrix adapted to be supplied with output signals from the register and producing a switching signal on a predetermined one of a plurality of input lines connected to the individual inputs of the switching means.

References Cited in the file of this patent

UNITED STATES PATENTS

| | | |
|---|---|---|
| 2,590,950 | Eckert et al. | Apr. 1, 1952 |
| 2,756,409 | Lubkin | July 24, 1956 |
| 2,783,453 | Rose | Feb. 26, 1957 |
| 2,817,701 | Johnson | Dec. 24, 1957 |
| 2,844,811 | Burkhart | July 22, 1958 |
| 2,855,513 | Hamburgen | Oct. 7, 1958 |